United States Patent
Sela et al.

(10) Patent No.: US 9,323,657 B1
(45) Date of Patent: Apr. 26, 2016

(54) MEMORY SYSTEM AND METHOD FOR IMPROVING READ LATENCY OF A HIGH-PRIORITY PARTITION

(71) Applicant: SanDisk Technologies Inc., Plano, TX (US)

(72) Inventors: Rotem Sela, Haifa (IL); Eliad Adi Klein, Sunnyvale, CA (US); Miki Sapir, Nes Ziona (IL)

(73) Assignee: SanDisk Technologies Inc., Plano, TX (US)

( * ) Notice: Subject to any disclaimer, the term of this patent is extended or adjusted under 35 U.S.C. 154(b) by 2 days.

(21) Appl. No.: 14/594,934

(22) Filed: Jan. 12, 2015

Related U.S. Application Data

(60) Provisional application No. 62/098,042, filed on Dec. 30, 2014.

(51) Int. Cl.
*G06F 12/02* (2006.01)

(52) U.S. Cl.
CPC .... *G06F 12/0238* (2013.01); *G06F 2212/1024* (2013.01)

(58) Field of Classification Search
CPC ................................................. G06F 12/0238
USPC ......... 711/173, 103, 137, 154, 156, 158, 206, 711/207, 221; 365/185.33
See application file for complete search history.

(56) References Cited

U.S. PATENT DOCUMENTS

| | | | | |
|---|---|---|---|---|
| 8,140,817 | B2* | 3/2012 | Schopp | G06F 9/5077 710/260 |
| 8,250,332 | B2* | 8/2012 | Plondke | G06F 12/1036 711/153 |
| 8,259,498 | B2* | 9/2012 | Yogev | G06F 12/0238 365/185.09 |
| 8,356,137 | B2* | 1/2013 | Post | G06F 3/0644 711/103 |
| 2010/0217949 | A1* | 8/2010 | Schopp | G06F 9/5077 711/173 |
| 2010/0318742 | A1* | 12/2010 | Plondke | G06F 12/121 711/123 |
| 2014/0157086 | A1 | 6/2014 | Sharon et al. | |
| 2014/0281126 | A1* | 9/2014 | Bleyer | G06F 3/061 711/103 |
| 2016/0019127 | A1* | 1/2016 | Creasman | G06F 11/2094 714/6.3 |

* cited by examiner

*Primary Examiner* — Stephen Elmore
(74) *Attorney, Agent, or Firm* — Brinks Gilson & Lione

(57) ABSTRACT

A memory system and method for improving read latency of a high-priority partition are provided. In one embodiment, a memory system receives a command to store data in the memory. The memory system determines if the command specified that the data is to be stored in a standard partition in the memory or in a high-priority partition in the memory. If the command specified that the data is to be stored in a standard partition in the memory, the memory system stores the data using a first write technique. If the command specified that the data is to be stored in a high-priority partition in the memory, the memory system stores the data using a second write technique, wherein the second write technique provides improved read latency of the stored data. Other embodiments are disclosed.

24 Claims, 10 Drawing Sheets

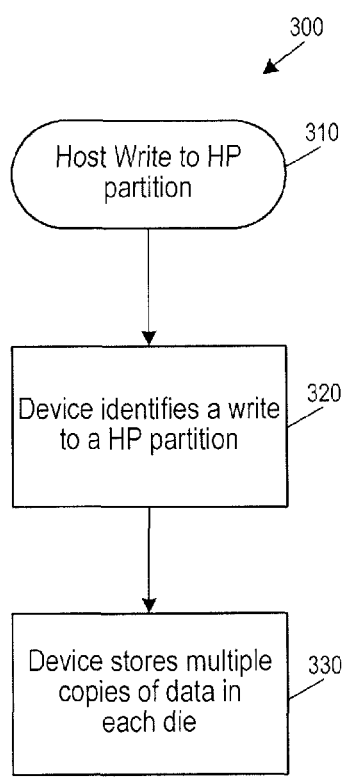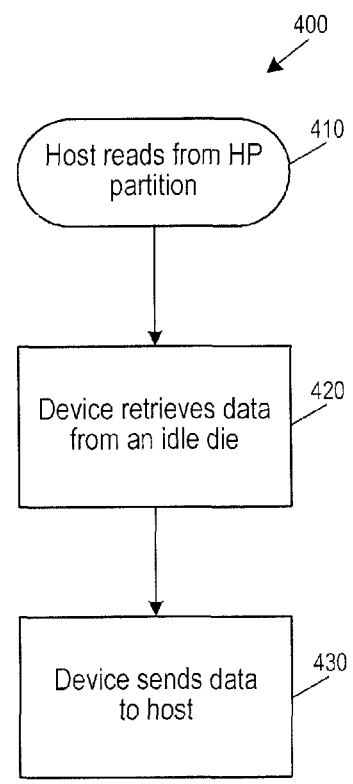
Figure 3
Figure 4

US 9,323,657 B1

MEMORY SYSTEM AND METHOD FOR IMPROVING READ LATENCY OF A HIGH-PRIORITY PARTITION

CROSS-REFERENCE TO RELATED APPLICATION

This application claims priority to U.S. Provisional Patent Application No. 62/098,042, filed Dec. 30, 2014, which is hereby incorporated by reference.

BACKGROUND

Non-volatile memory (e.g., Flash) is often organized in partitions (or logical units), which are ranges of logical block addresses (LBAs). Some memory systems identify certain partitions as high priority. When the memory system receives a host command targeted to a high-priority partition, the memory system can provide preferred execution ordering relative to commands targeting other partitions. For example, after the memory system identifies a command as being targeted to a high-priority partition, the memory system can place the command at the head of its execution pipeline by marking the command as the next command to be served. If the command to the high-priority partition is received while the memory system is executing another command, the memory system can allow the execution of the prior command to complete or can interrupt the execution of the prior command in favor of the high-priority command.

A high-priority partition is sometimes used to store code that is executed by a processor. For example, in a system-on-chip (SoC) device, the high-priority partition can be used to store executable code for a peripheral (e.g., a modem) on the chip. Some applications require a very low latency in reading the code (e.g., less than 2 ms). In such situations, an application processor in the SoC can load parts of the code it will need to execute from the high-priority partition to volatile memory (e.g., DRAM) without execution delays. However, if the application processor needs to execute a part of the code that is not cached in DRAM (e.g., if a "page fault" occurs), the application processor would need to retrieve the code it needs from the non-volatile memory, which may result in not meeting the low latency read requirement. To avoid this possibility and guarantee low read latency, the entirety of the code can be cached in DRAM. However, DRAM is a much more expensive resource than non-volatile memory, so keeping the entire code in DRAM consumes a costly resource.

OVERVIEW

Embodiments of the present invention are defined by the claims, and nothing in this section should be taken as a limitation on those claims.

By way of introduction, the below embodiments relate to a memory system and method for improving read latency of a high-priority partition. In one embodiment, a memory system receives a command to store data in the memory. The memory system determines if the command specified that the data is to be stored in a standard partition in the memory or in a high-priority partition in the memory. In response to determining that the command specified that the data is to be stored in a standard partition in the memory, the memory system stores the data using a first write technique. In response to determining that the command specified that the data is to be stored in a high-priority partition in the memory, the memory system stores the data using a second write technique, wherein the second write technique provides improved read latency of the stored data. For example, the first write technique can store the data in only one memory die, while the second write technique can replicate the data in all of the memory dies. As another example, different trim parameters can be used, or data can be stored in single-level cell memory instead of multi-level cell memory.

In another embodiment, the memory system reads a logical-to-physical address table of the high priority partition from its memory and sends it to a host. The memory system then receives a command from the host to read data stored in the high-priority partition, wherein the command from the host contains a physical address from the logical-to-physical address table sent to the host. Instead of sending the logical-to-physical address table to the host and receiving a physical address from the host, another possible approach is for the memory system to store the entire logical-to-physical address table of the high-priority partition in volatile memory of the memory system.

Other embodiments are possible, and each of the embodiments can be used alone or together in combination. Accordingly, various embodiments will now be described with reference to the attached drawings.

BRIEF DESCRIPTION OF THE DRAWINGS

FIG. 3 is a flow chart of a method of an embodiment for writing data to a high-priority partition over multiple dies.

FIG. 4 is a flow chart of a method of an embodiment for reading data from a high-priority partition stored over multiple dies.

DETAILED DESCRIPTION OF THE PRESENTLY PREFERRED EMBODIMENTS

As mentioned in the background section above, accesses to high-priority partitions (or logical units) can be given priority over accesses to lower-priority partitions. However, even with such priority, reads from the high-priority partitions may not meet low latency requirements in certain environments, such as when a high-priority partition stores executable code, for example. (It should be understood that the "data" stored in the high-priority partition in these embodiments can take any form and is not limited to executable code.) In prior system, this problem was addressed by caching the entirety of the code in volatile memory (e.g., DRAM) to guarantee that the low latency requirements are met. However, volatile memory is usually a much more expensive resource than non-volatile memory, so keeping the entirety of the code in DRAM is very costly from a resource point of view. The following embodiments provide a memory system and method for reading data from a high-priority partition in a way that provides for low latency reads and thereby avoids the need for using as much volatile memory in some circumstances. Before turning to these and other embodiments, the following paragraphs provide a discussion of exemplary memory systems that can be used with these embodiments. Of course, these are just examples, and other suitable types of memory systems can be used.

Figure 1:
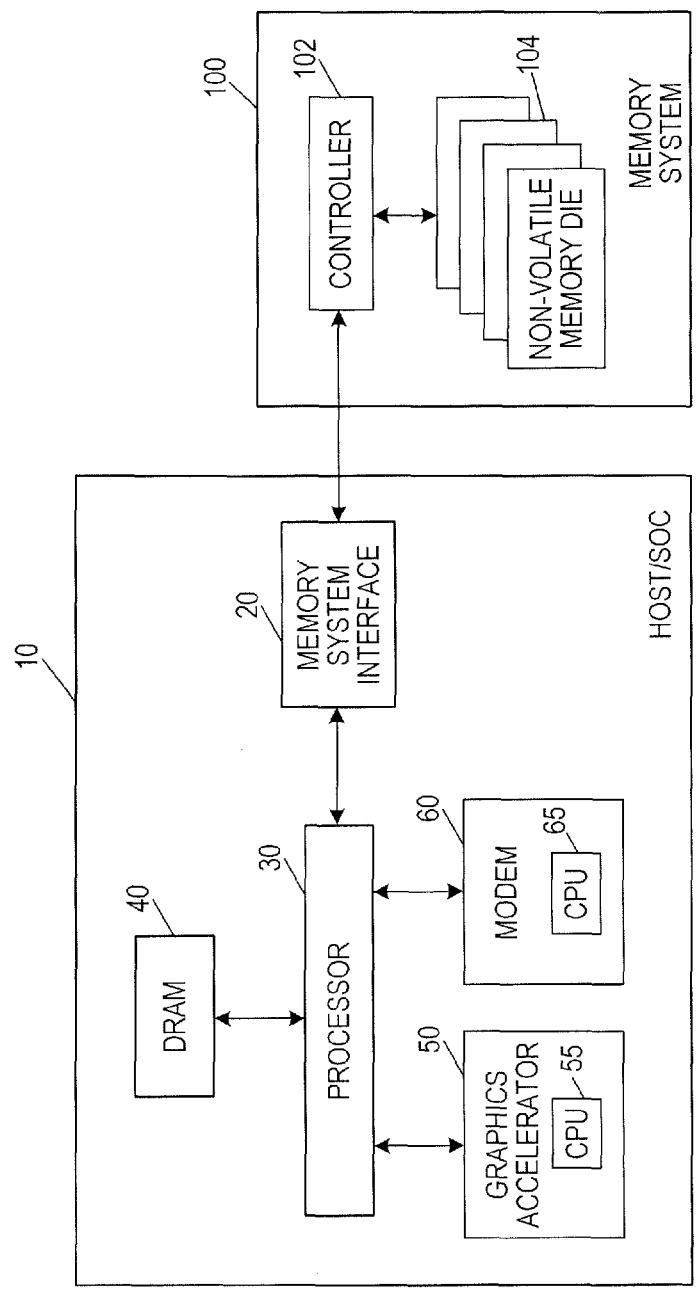
FIG. 1 is a block diagram of a host and a non-volatile memory system of an embodiment.

Turning now to the drawings, FIG. 1 is a block diagram of a host 10 and memory system 100 of an embodiment. In this example, the host 10 takes the form of a system-on-chip (SoC), which is an integrated circuit that integrates all the component of the host into a single chip. The host 10 can take any other suitable form, including, but not limited to, a mobile phone, a tablet computer, a digital media player, a game device, a personal digital assistant (PDA), a mobile (e.g., notebook, laptop) personal computer (PC), or a book reader. The host 10 includes a memory system interface 20 for interfacing with the memory system 100, a processor 30, volatile memory (e.g., DRAM) 40, and one or more peripherals, which, in this embodiment, takes the form of a graphics accelerator 50 and modem 60, each with its own processor 55, 65.

Non-volatile memory system 100 includes a controller 102 and non-volatile memory that may be made up of one or more non-volatile memory dies 104. As used herein, the term die refers to the collection of non-volatile memory cells, and associated circuitry for managing the physical operation of those non-volatile memory cells, that are formed on a single semiconductor substrate. Controller 102 interfaces with the host 10 and transmits command sequences for read, program, and erase operations to non-volatile memory dies 104. While shown as being separate from the host 10 in FIG. 1, the memory system 100 can be integrated with the host 10, such as when the memory system 100 is embedded in the host 10.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with the host 10. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory dies 104 may be any suitable flash interface, such as Toggle Mode 200, 400, or 800. In one embodiment, memory system 100 may be a card based system, such as a secure digital (SD) or a micro secure digital (micro-SD) card, or a USB device, for example. In an alternate embodiment, memory system 100 may be part of an embedded memory system.

Although, the non-volatile memory system 100 includes a single channel between controller 102 and non-volatile memory dies 104, the subject matter described herein is not limited to having a single memory channel. For example, in some NAND memory system architectures, 2, 4, 8 or more NAND channels may exist between the controller and the non-volatile memory dies 104, depending on controller capabilities. In any of the embodiments described herein, more than a single channel may exist between the controller and the memory die, even if a single channel is shown in the drawings.

Also, although shown by itself in FIG. 1, the memory system 100 can be part of a storage module that includes plural non-volatile memory systems 100. The interface between a storage controller of the storage module and non-volatile memory systems 100 may be a bus interface, such as a serial advanced technology attachment (SATA) or peripheral component interface express (PCIe) interface. For example, a storage module may be a solid state drive (SSD), such as found in portable computing devices, such as laptop computers, and tablet computers. As another alternative, a hierarchical storage system can be used, where there are a plurality of storage controllers, each of which controls a respective storage system. Host systems may access memories within the storage system via a bus interface. In one embodiment, the bus interface may be an NVMe or fiber channel over Ethernet (FCoE) interface. In one embodiment, such a system may be a rack mountable mass storage system that is accessible by multiple host computers, such as would be found in a data center or other location where mass storage is needed.

Figure 2:
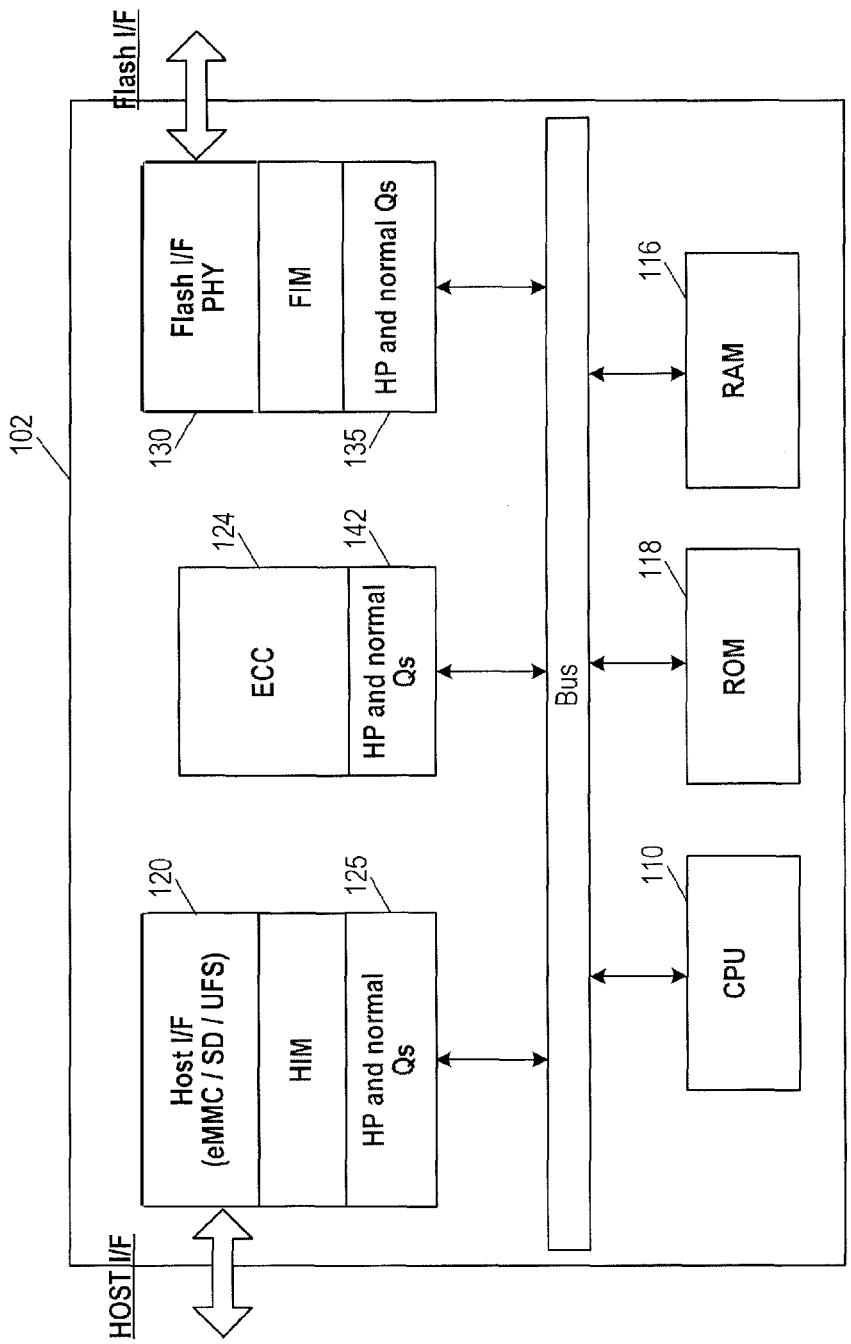
FIG. 2 is a block diagram of a controller of an embodiment.

Returning to the drawings, FIG. 2 shows one exemplary implementation of the controller 102. As shown in FIG. 2, the controller 102 in this embodiment comprises a CPU 110, ROM 118, RAM 116, a host interface (HIM) 120 with high-priority and normal queues 125, a flash interface (FIM) 130 with high-priority and normal queues 135, and an ECC engine 124 with high-priority and normal queues 142.

The HIM 120 and FIM 130 provide the electrical interfaces with the host (or next level storage controller) and non-volatile memory dies 104, respectively. The HIM 120 typically facilitate transfer for data, control signals, and timing signals, and the FIM 130 provides the command sequences to the memory dies 104 and receives status information from the memory dies 104. The choice of the type of HIM 120 can depend on the type of memory being used. Examples of HIMs 120 include, but are not limited to, eMMC, SD, UFS, SATA, SATA Express, SAS, Fibre Channel, USB, PCIe, and NVMe. Similarly, the choice of the type of FIM 130 can depend on the type of non-volatile memory dies being used. For example, the FIM 130 may be a double data rate (DDR) interface, such as a Toggle Mode 200, 400, or 800.

In one embodiment, the RAM 116 temporarily stores data, and the ROM 118 stores system boot code. The RAM 116 and/or ROM 118 may be located outside of the controller 102. The error correction controller (ECC) engine 124 encodes the data bytes received from the host 10 and decodes and error corrects the data bytes read from the non-volatile memory dies 104.

The controller 102 can contain other modules for implementing the various functions discussed herein. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

As mentioned above, accesses to high-priority partitions (or logical units) can be given priority over accesses to lower-priority partitions. (As used herein, a "partition" (or "logical unit") refers to a range of logical block addresses (LBAs).) Previous usages of a high-priority partition included placement, by the memory controller, of the command targeted to the high-priority partition at the head of a host interface module (HIM) queue. However, even with such priority, reads from the high-priority partitions may not meet low latency requirements in certain environments and usage conditions. In prior systems, this problem was addressed by using volatile memory (e.g., DRAM) more extensively, but this is a resource-costly solution.

The following embodiments provide different techniques that can be used to reduce the read latency from a high-priority partition. Some techniques are directed to how the data is stored in the memory system 100, while other techniques are directed to how the data is read from the memory system 100. These embodiments can be used to replace expensive DRAM by utilizing flash-based high-priority partition operations for applications that require low read latency but may not necessarily have strict requirements for write operations. Also, it should be noted that while the below examples will be illustrated in terms of a read command, these embodiments can also be used for write or erase commands. Accordingly, the term "memory access" will be used to refer to a read, write, and/or erase command.

One cause of a long read latency can be when the memory die storing the high-priority partition is busy when the high-priority partition is desired to be read. If the memory system waits until the in-progress operation is complete and the memory die is free, the latency requirement may not be met. Alternatively, the memory system may interrupt the in-progress operation in favor of the read to the high-priority partition. However, some operations (such as an atomic block erase) cannot be interrupted.

In some of following embodiments, a first write technique is used when storing data in a standard partition in memory, and a second write technique is used when storing data is a high-priority partition in memory, wherein the second write technique provides improved read latency of the stored data.

For example, with reference to the flow chart 300 in FIG. 3, when the host 10 requests a write to the high-priority partition (act 310), the memory system 100 (sometimes referred to herein as the "device") identifies the write as being directed to the high-priority partition (act 320) and stores (replicates) multiple copies of the data in each of the plurality of memory dies 104 (e.g., 4 dies, 4 copies, instead of 1 copy in 1 die, as with a write to a standard partition) (act 330). As shown in the flow chart 400 of FIG. 4, when the host 10 attempts to read from the high-priority partition (act 410), the memory system 100 retrieves the data from any idle die (i.e., a die that is not busy handling other operations) (act 420) and sends the data to the host (act 430). The memory system controller 102 can make sure that, at any given time, not all dies are occupied with regular operations. Hence, at least one die would be idle. Therefore, the memory system 100 would not have to wait to finish the current operation or stop a current operation in order to serve the high-priority partition command.

Figure 5:
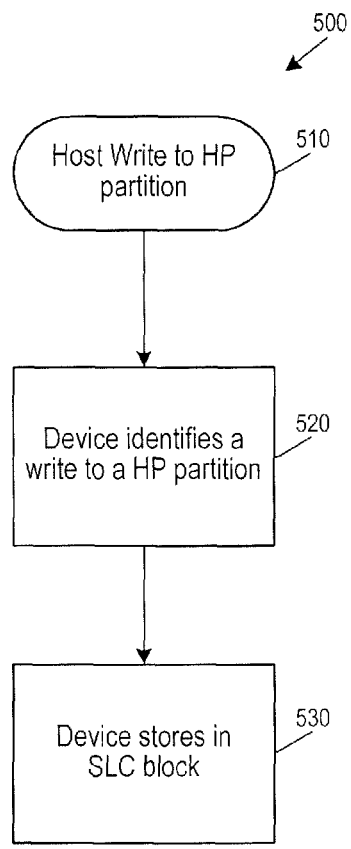
FIG. 5 is a flow chart of a method of an embodiment for storing a high-priority partition in a single-level cell (SLC) block.

In another embodiment (shown in the flow chart 500 of FIG. 5), when the host 10 writes to the high-priority partition (act 510), the memory system 100 identifies the write as being directed to the high-priority partition (act 520) and stores the data in a single-level cell (SLC) block in memory 104 (act 530). The sense time from SLC memory is about 50% of the sense time from MLC memory. So, using SLC memory to store the high-priority partition can result in reducing the read latency of the high-priority partition, as compared to when MLC memory is used to store the high-priority partition.

Figure 6:
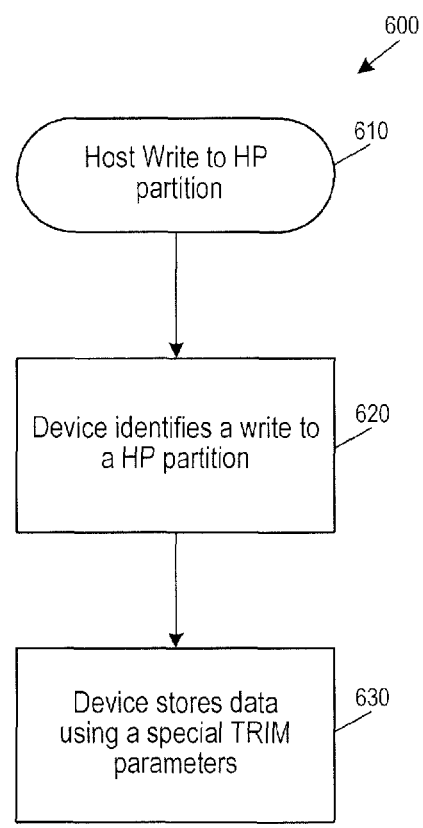
FIG. 6 is a flow chart of a method of an embodiment for writing data to a high-priority partition using trim parameters.

In yet another embodiment (shown in the flow chart 600 of FIG. 6), when the host 10 writes to the high-priority partition (act 610), the memory system 100 identifies the write as being directed to the high-priority partition (act 620) and stores the data in the high-priority partition using special trim (programming) parameters (act 630). Writing data with special trim (programming) parameters may require a slower write procedure, but reads would be expected to be faster. That is, programming to a high-priority partition can include repetitive programming steps in order to guarantee optimal encoding of the data (narrow beams at the flash cell). This would improve decoding latency as "lighter" ECC could be used for those cells.

Figures 7, 8:
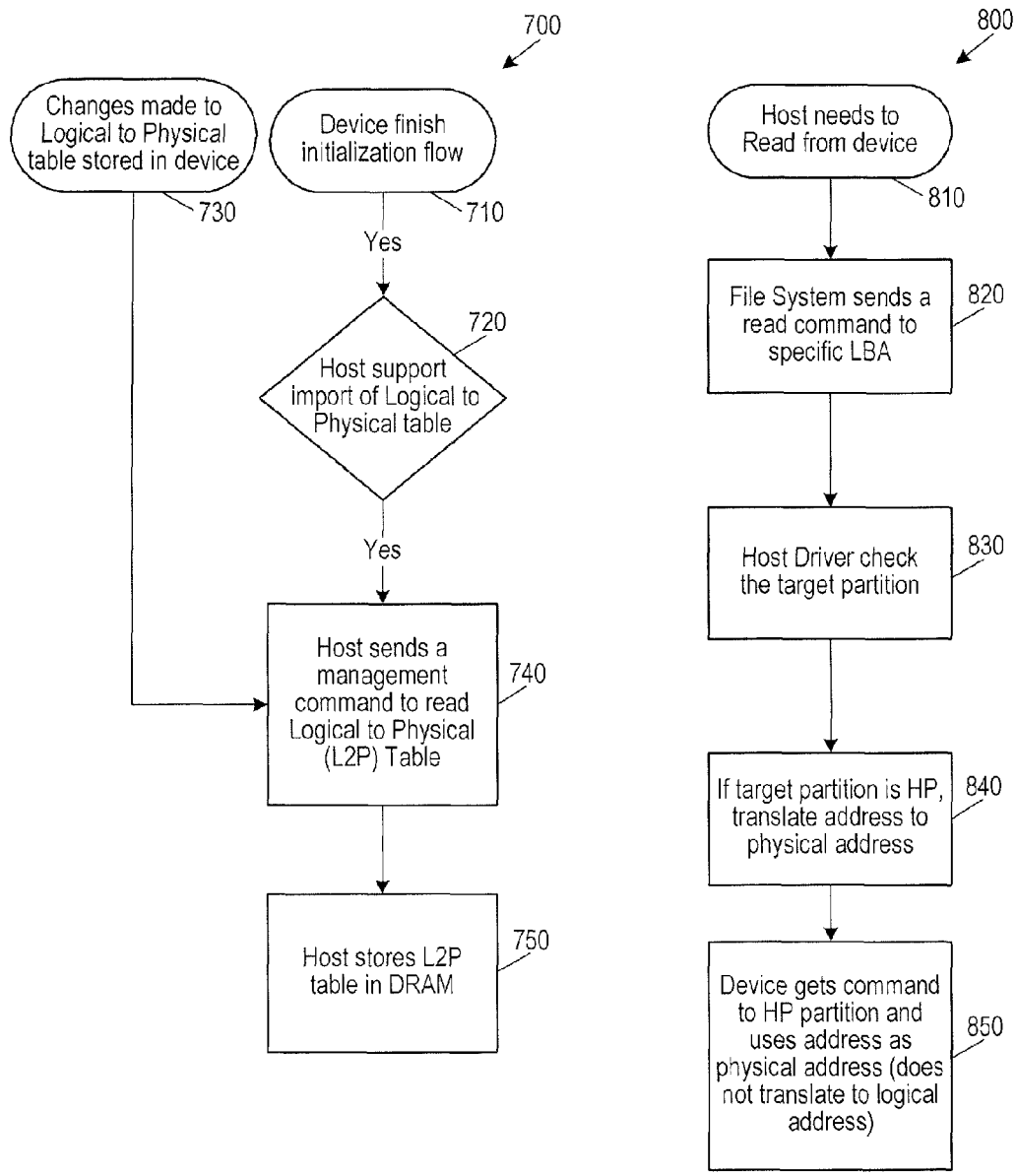
FIG. 7 is a flow chart of a method of an embodiment for storing a memory system's logical-to-physical address table in a host.
FIG. 8 is a flow chart of a method of an embodiment for using a memory system's logical-to-physical address table stored in a host.

Another embodiment recognizes that part of the read latency is caused by the memory system translating a logical address received from the host 10 into a physical address by reading from the mapping tables on memory dies. In this embodiment, the host 10 gets a copy of the memory system's logical-to-physical ("L2P") address table/map, so it can send physical addresses (which do not need translating) to the memory system 100 instead of logical addresses (which do need translating). By avoiding the logical-to-physical translation, the memory system 100 can reduce read latency. FIGS. 7 and 8 contain flow charts 700, 800 that illustrate this embodiment.

As shown in FIG. 7, when the memory device 100 finishes its initialization flow (act 710), if the host 10 supports the import of the logical-to-physical address table (act 720), it will send a management command to read the logical-to-physical address table (act 740). The memory system 100 sends the logical-to-physical address table to the host 10, which stores it in its RAM 40 (act 750). With this process, the host 10 would sync with memory system 100 on the logical-to-physical address table of the high-priority partition. If changes are made to the logical-to-physical address table stored in the memory system 100 after the initial sync by a new write command to the high-priority partition (act 730), another sync will need to take place (act 740 and act 750). However, if the data stored in the high-priority partition is relatively static (e.g., executable code), it is unlikely that such changes will occur.

With reference to FIG. 8, when the host 10 needs to read from the memory system (act 810), the file system (or other component) of the host 10 sends a read command for a specific logical block address (LBA) to the host's driver (act 820), which checks the target partition (act 830). If the target partition is a high-priority partition, the host 10 uses the memory system's logical-to-physical address table cached in its RAM 40 to translate the logical address to a physical address (act 840). The host 10 then sends the read command along with the physical address to the memory system 100, which uses the physical address to access the high-priority partition without translating the address (act 850). Providing physical addresses instead of logical addresses to the memory system 100 would reduce the read latency as the memory system 100 will avoid the additional read to fetch the logical-to-physical address table from the memory 104 in order to find out the physical location of the data to be read.

Figure 9:
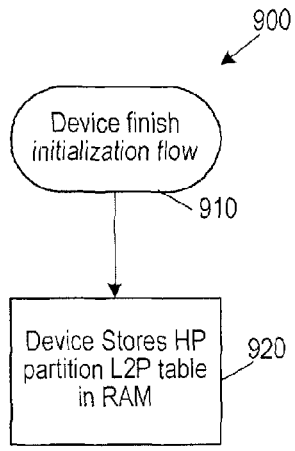
FIG. 9 is a flow chart of a method of an embodiment for storing a copy of the high-priority partition logical-to-physical address table in memory system RAM.
Figure 10:
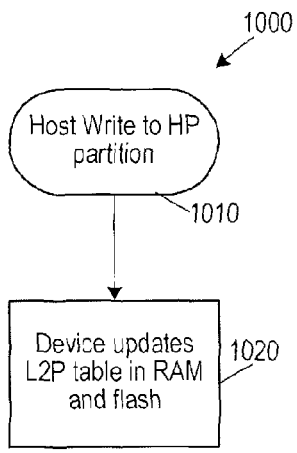
FIG. 10 is a flow chart of a method of an embodiment for updating a logical-to-physical address table stored in memory system RAM.
Figure 11:
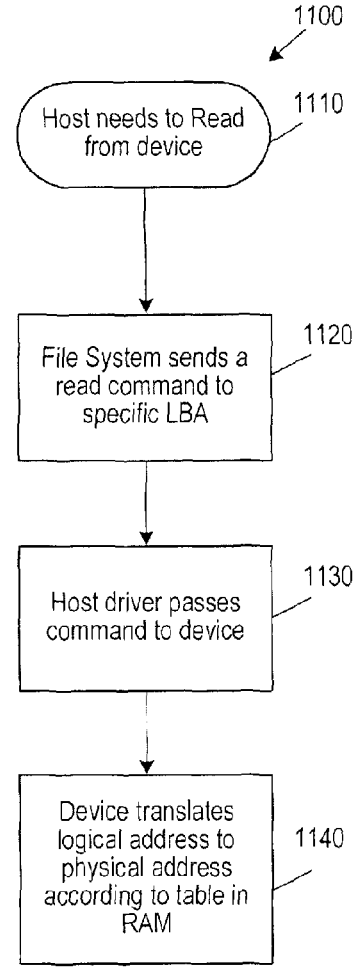
FIG. 11 is a flow chart of a method of an embodiment for performing a read command.

In another embodiment, instead of sending the logical-to-physical address table from the non-volatile memory dies 104 in the memory system 100 to the host 10, the memory system 100 can keep a copy of the high-priority logical-to-physical address table permanently in the memory system's RAM 116. This way, the memory system 100 would not need to read the high-priority logical-to-physical address table from the non-volatile (flash) memory 104 on every read, which would save time and reduce read latency. This embodiment is shown in the flow charts 900, 1000, 1100 of FIGS. 9-11. As shown in the flow chart 900 in FIG. 9, when the memory system 100 finishes its initialization flow (act 910), the high-priority logical-to-physical address table is read from flash 104 and stored in RAM 116 (act 920). As shown in the flow chart 1000 in FIG. 10, when the host 10 writes to the high-priority partition (act 1010), the memory system 100 updates the high-priority logical-to-physical address table in its RAM 116 and flash 104 (act 1020). As shown in the flow chart 1100 in FIG. 11, when the host 10 needs to read from the memory system (act 1110), the file system of the host 10 sends a read command for a specific logical block address (LBA) to the host's driver (act 1120), which passes the command to the memory system (act 1130), which would translate the logical address to a physical address according to the high-priority logical-to-physical address table in its RAM 116 (act 1140).

Other embodiments for improving read latency in a high-priority partition relate to the sleep policy of the memory system 100. The memory system 100 can be placed in sleep mode by the host 10, in which case the host 10 may turn off the power supply (VCC) to the memory dies 104. So, it would be the host's 10 responsibility not to turn off the VCC power supply to the memory dies 104. Instead, when the host 10 asks the memory system 100 to be in sleep mode, the controller 102 will turn off all memory dies 104 but the one containing the high-priority partition. In auto-sleep mode, the memory system 100 enters sleep mode by itself without host 10 notification. Similarly, in this mode, the controller 102 will turn off all memory dies 104 but the one containing the high-priority partition.

In sleep mode, the memory system 100 enters a low-power mode in which the memory dies 104 (and other components) can be turned off. However, if a read to a high-priority partition is received while the memory system 100 is in sleep mode, time is required to enable (wake up) the memory dies 104 before the high-priority partition can be read. This can result in failing a read latency requirement. Accordingly, in one embodiment, when entering the sleep state, the memory system 100 can always keep one die in a standby (chip enable) state. This policy will help guarantee that if a high-priority partition is read during the time the memory system is in sleep mode, the read can be handled immediately without waiting for a flash wakeup/reset time. This embodiment is shown in the flow chart 1200 in FIG. 12.

Figure 12:
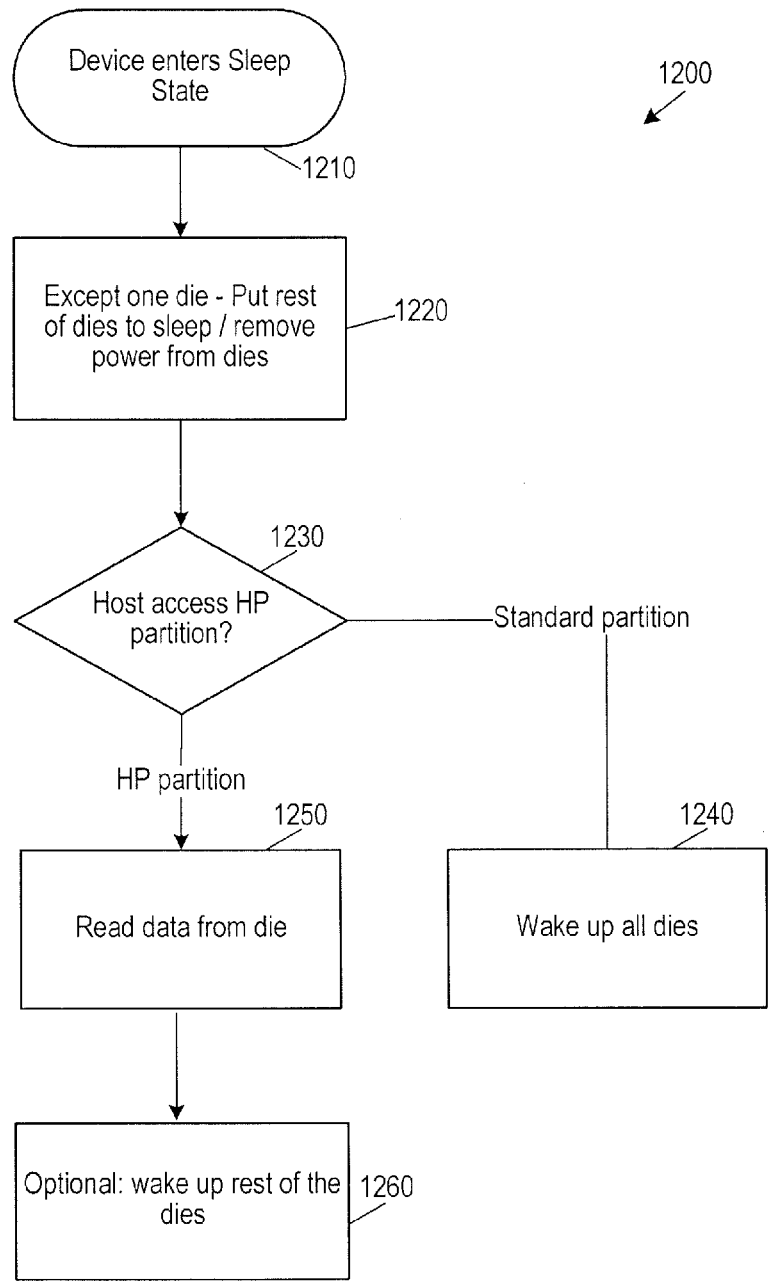
FIG. 12 is a flow chart of a method of an embodiment for reading a high-priority partition from a memory die that is left awake when others are put to sleep.

As shown in FIG. 12, when the memory system 100 enters the sleep mode (e.g., when in auto-sleep or when the host 10 notifies the memory system 100 to enter the sleep mode) (act 1210), the memory system 100 puts all the memory dies 104 to sleep (e.g., remove power from the dies) except for the die(s) that contain the high-priority partition (act 1220). When the host 10 attempts to read from the memory 104, the memory system 100 determines if the read is directed to a standard partition or to a high-priority partition (act 1230). If the read is directed to a standard partition, the memory system 100 wakes up all dies 104 (act 1240). However, if the read is directed to the high-priority partition, the memory system 100 reads from the die containing that partition, as that die was not put to sleep with the rest of the dies (act 1250). Optionally, the memory system 100 can then wake up the rest of the dies (act 1260).

Another sleep policy embodiment involves situations, as discussed above, when the high-priority logical-to-physical address table is stored in the memory device's RAM 116. To make sure this table is available when needed, in one embodiment, the RAM can be "always on" (e.g., be powered by a separate power island from the other RAMs in the memory system 100). When the memory system 100 is put into sleep mode, the high-priority logical-to-physical address table in the always-on RAM (the "HPRAM") will be retained and will be available for use upon wakeup. This embodiment is shown in the flow chart 1300 in FIG. 13.

Figure 13:
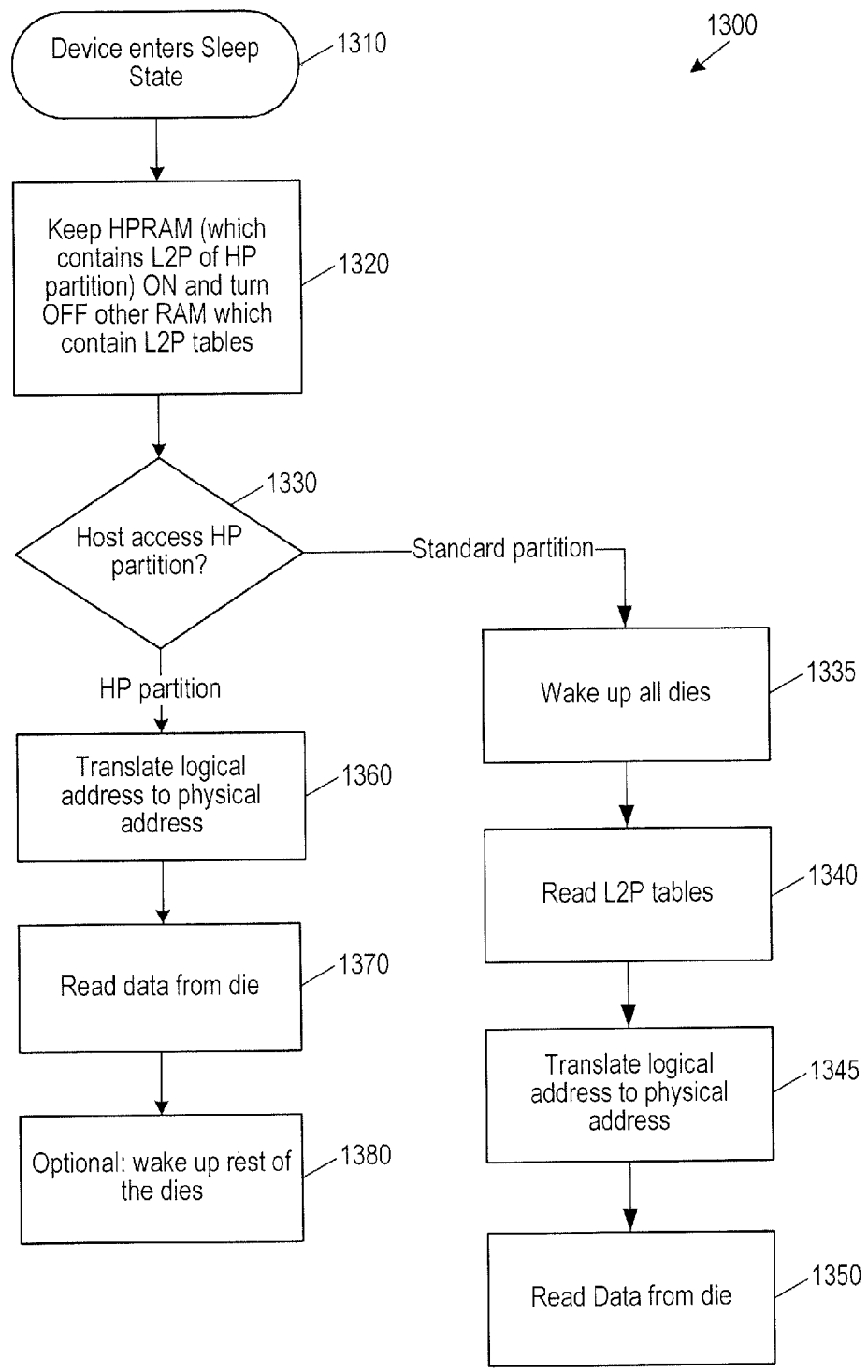
FIG. 13 is a flow chart of a method of an embodiment for using a logical-to-physical address table stored in a memory system.

As shown in FIG. 13, when the memory system 100 enters the sleep state (act 1310), the memory system 100 keeps the HPRAM on and turns off the other RAMs that may contain parts of the logical-to-physical address maps of non-high-priority partitions (act 1320). When the host 10 sends a read command to the memory system 100, the memory system 100 determines if the read is directed to the standard partition or to the high-priority partition (act 1330). If the read is directed to the standard partition, the memory system 100 wakes up all the memory dies 104 (act 1335), reads the logical-to-physical address tables (act 1340), translates the logical address to a physical address using the tables (act 1345), and then reads the data from the die (act 1350). However, if the read is directed to the high-priority partition, the memory system 100 translates the logical address to a physical address using the table stored in the HPRAM (act 1360), reads the data from the die (act 1370), and, optionally, wakes up the rest of the dies (act 1380).

Another embodiment relates to a background operations (BKOPs) policy change for memory systems with a high-priority partition. Specifically, when background operations are needed, instead of performing the background operations on all memory dies 104 in parallel, the memory system 100 can keep one die available and ready for a high-priority partition read operation. This will help eliminate any potential delay in the sense operation due to background operations on other dies. This embodiment is shown in the flow chart 1400 in FIG. 14.

Figure 14:
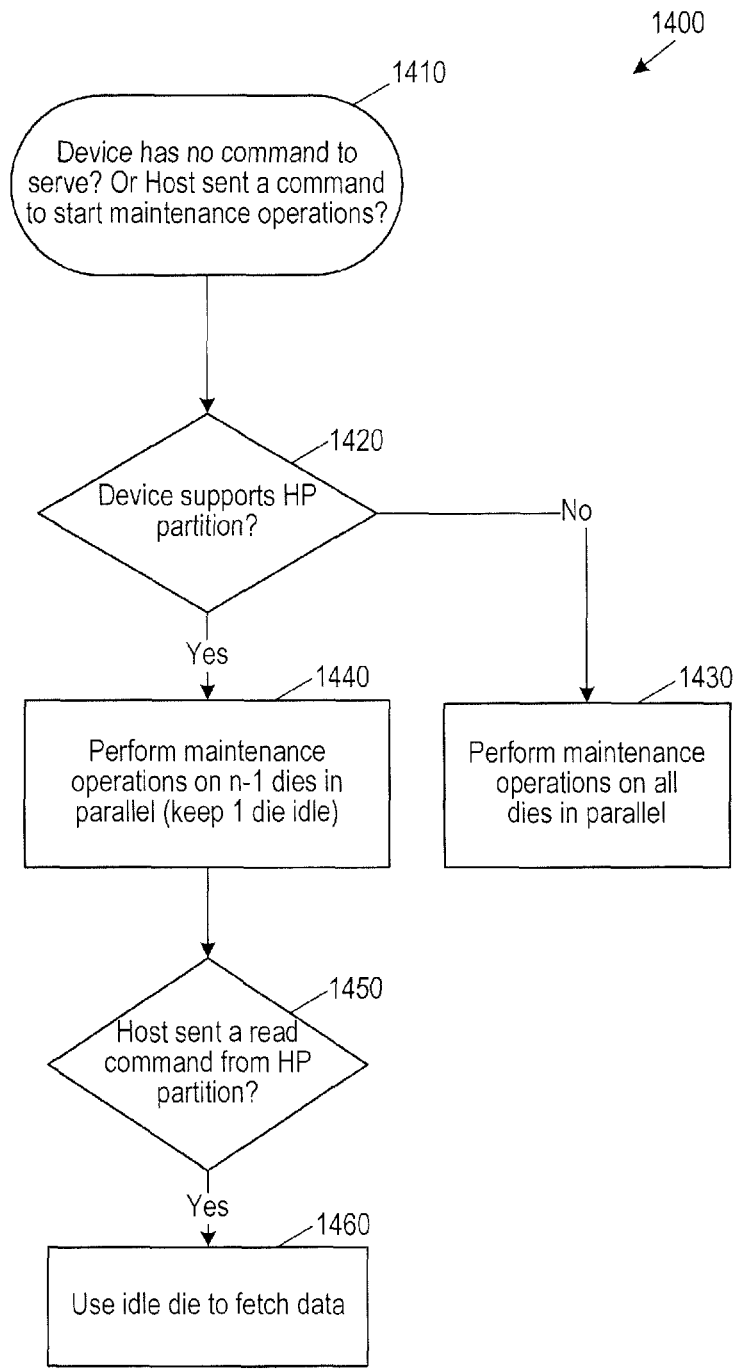
FIG. 14 is a flow chart of a method of an embodiment for performing memory system background operations.

As shown in FIG. 14, the memory system 100 first determines if there are no commands to serve or if the host 10 sent a command to start a maintenance operation (act 1410). If so, the memory system 100 determines if it supports a high-priority partition (act 1420). If it does not, the memory system 100 performs maintenance on all memory dies in parallel (act 1430). If it does, the memory system 100 performs maintenance operations on n−1 memory dies in parallel, keeping one memory die (with the high-priority partition) idle (act 1440). So, when the host 10 sends a command to read from the high-priority partition (act 1450), the memory system 100 uses the idle memory die to fetch the requested data (act 1460).

Another embodiment reduces read latency to a high-priority partition by using a different data path for the high-priority partition. In general, to prevent any delay in a read of a high-priority partition, the critical data-path/pipeline elements between the memory 104 and the host interface 120 (FIG. 2) can be duplicated and needed data-path resources can be reserved for high-priority partition usage. This is shown in FIG. 2 by having separate queues 125, 135, 142 in the host and memory interfaces 120, 130 and the ECC engine 124. The regular data path components (e.g., RAM 116, DMAs, ECC engine 124) can be busy during non-high-priority partition operations and during background operations. Having a separate data-path for high-priority partition operations can help guarantee no delays or stalls in high-priority partition operations reads. As an alternative to having a different data path, a "head of queue" can be placed in all queues in the device's sub-systems (e.g., HIM 120 queue, ECC 124 queue, and FIM 130 queue). In standard architectures, the "head of queue" option would be valid for the HIM.

In yet another embodiment, the memory system 100 can read ahead (prefetch) from the memory dies 104 to the RAM 116. The host 10 boot may happen in a pre-defined order and access to the high-priority partition may be done in a pre-defined manner (e.g., reading the modem boot code would be done in ordinary manner). The memory system 100 can identify a predefined order of access to the high-priority partition and may pre-fetch data to its RAM 116 before the host 10 sends the read command.

Another alternative relates to the configuration of a partition. Currently, there is only the ability to configure a partition as a high-priority partition. In an alternate embodiment, configuration parameters can be used through which the host 10 can specify to the memory system 100 that a partition is a high priority-read partition, high-priority write partition, both, or neither.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for improving read latency of a high-priority partition, the method comprising:
    performing the following in a memory system comprising a memory:
        receiving a command to store data in the memory;
        determining if the command specified that the data is to be stored in a standard partition in the memory or in a high-priority partition in the memory;
        in response to determining that the command specified that the data is to be stored in a standard partition in the memory, storing the data using a first write technique; and
        in response to determining that the command specified that the data is to be stored in a high-priority partition in the memory, storing the data using a second write technique, wherein the second write technique provides improved read latency of the stored data.

2. The method of claim 1, wherein the memory comprises a plurality of memory dies, wherein the first write technique stores the data in one memory die, and wherein the second write technique replicates the data in all of the plurality of memory dies.

3. The method of claim 1, wherein the memory comprises single-level memory cells and multi-level memory cells, wherein the first write technique stores the data in the multi-level memory cells, and wherein the second write technique stores the data in the single-level memory cells.

4. The method of claim 1, wherein the second write technique uses different trim parameters than the first write technique.

5. The method of claim 1, wherein the memory is a three-dimensional memory.

6. The method of claim 1, wherein the memory system is embedded in a host.

7. The method of claim 1, wherein the memory system is removably connected to a host.

8. A method for improving read latency of a high-priority partition, the method comprising:
    performing the following in a memory system comprising a memory storing a logical-to-physical address table of a high-priority partition of the memory:
        reading the logical-to-physical address table of the high-priority partition from the memory;
        sending the logical-to-physical address table of the high-priority partition to a host in communication with the memory system; and
        receiving a command from the host to read data stored in the high-priority partition, wherein the command from the host contains a physical address from the logical-to-physical address table of the high-priority partition sent to the host.

9. The method of claim 8, wherein instead of sending the logical-to-physical address table of the high-priority partition to the host and receiving a physical address from a host, storing the entire logical-to-physical address table of the high-priority partition in volatile memory of the memory system.

10. The method of claim 9, wherein the volatile memory is powered when other volatile memory in the memory system is not powered.

11. The method of claim 8 further comprising keeping awake the memory die storing the logical-to-physical address table of the high-priority partition when other memory dies are put to sleep.

12. The method of claim 8 further comprising keeping in standby the memory die storing the logical-to-physical address table of the high-priority partition when background operations are being performed in the other memory dies.

13. The method of claim 8 further comprising prefetching data from the high-priority partition.

14. The method of claim 8 further comprising using a different data path when reading data from the high-priority partition as compared to read data from a standard partition.

15. The method of claim 8, wherein the memory is a three-dimensional memory.

16. The method of claim 8, wherein the memory system is embedded in a host.

17. The method of claim 8, wherein the memory system is removably connected to a host.

18. A memory system comprising:
a memory; and
a controller in communication with the memory, wherein the controller is configured to:
 determine whether an access request is for a standard partition or a high-priority partition in the memory;
 in response to determining that the access request is for the standard partition in the memory, store the data using a first write technique; and
 in response to determining that the access request is for the high-priority partition in the memory, store the data using a second write technique, wherein the second write technique provides improved read latency of the stored data.

19. The memory system of claim 18, wherein the memory comprises a plurality of memory dies, wherein the first write technique stores the data in one memory die, and wherein the second write technique replicates the data in all of the plurality of memory dies.

20. The memory system of claim 18, wherein the memory comprises single-level memory cells and multi-level memory cells, wherein the first write technique stores the data in the multi-level memory cells, and wherein the second write technique stores the data in the single-level memory cells.

21. The memory system of claim 18, wherein the second write technique uses different trim parameters than the first write technique.

22. The memory system of claim 18, wherein the memory is a three-dimensional memory.

23. The memory system of claim 18, wherein the memory system is embedded in a host.

24. The memory system of claim 18, wherein the memory system is removably connected to a host.

* * * * *